United States Patent [19]

Presswood

[11] Patent Number: 4,831,977

[45] Date of Patent: May 23, 1989

[54] PISTONS WITH WEAR RESISTANT SOLID FILM LUBRICANT COATINGS

[75] Inventor: J. Kenneth Presswood, Baton Rouge, La.

[73] Assignee: Ethyl Corporation, Richmond, Va.

[21] Appl. No.: 74,716

[22] Filed: Jul. 17, 1987

[51] Int. Cl.⁴ .......................... F22B 5/00; B05D 3/02
[52] U.S. Cl. .................... 123/193 P; 252/12; 427/372.2; 427/385.5; 427/388.2; 427/388.5; 427/393.5
[58] Field of Search ............ 252/12; 427/372.2, 385.5, 427/393.5, 388.2, 388.5; 123/193 P

[56] References Cited

U.S. PATENT DOCUMENTS

| | | | |
|---|---|---|---|
| 3,252,905 | 5/1966 | Schaeffer | 252/12 |
| 3,356,648 | 12/1967 | Rogers | 528/353 |
| 3,380,843 | 4/1967 | Davis | 252/12 |
| 3,542,735 | 11/1967 | Lynch | 528/126 |
| 3,652,409 | 3/1972 | Mack et al. | 252/12 |
| 3,671,486 | 6/1972 | Dixon et al. | 252/12 |
| 3,761,453 | 9/1973 | Jones | 525/419 |
| 3,781,205 | 12/1973 | Carins et al. | 252/12 |
| 3,792,022 | 2/1974 | Jones | 525/123 |
| 3,908,038 | 9/1975 | Nienart et al. | 252/12 |
| 3,926,913 | 12/1975 | Jones et al. | 525/421 |
| 3,951,902 | 4/1976 | Jones et al. | 524/430 |
| 3,959,350 | 5/1976 | Rogers | 528/185 |
| 4,012,478 | 3/1977 | Horikawa et al. | 252/12 |
| 4,100,138 | 7/1978 | Bilow et al. | 526/262 |
| 4,111,906 | 9/1978 | Jones et al. | 528/229 |
| 4,173,700 | 11/1979 | Green et al. | 528/125 |
| 4,196,277 | 4/1980 | Jones et al. | 528/208 |
| 4,203,922 | 5/1980 | Jones et al. | 528/185 X |
| 4,283,521 | 8/1981 | Jones | 528/117 |
| 4,376,710 | 3/1983 | Gardos et al. | 252/12 |
| 4,435,839 | 3/1984 | Gu et al. | 252/12 |
| 4,454,310 | 6/1984 | Oka et al. | 528/188 |
| 4,477,648 | 10/1984 | Jones et al. | 528/185 |
| 4,521,623 | 6/1985 | Jones et al. | 564/430 |
| 4,522,880 | 6/1985 | Klostermeier et al. | 428/332 |
| 4,528,004 | 7/1985 | Makino et al. | 427/385.5 |
| 4,528,216 | 7/1985 | Ogura et al. | 427/385.5 |
| 4,532,054 | 7/1985 | Johnson | 252/12 |
| 4,533,574 | 8/1985 | Fryd et al. | 427/385.5 |
| 4,535,101 | 8/1985 | Lee et al. | 521/189 |
| 4,543,295 | 9/1985 | St. Clair et al. | 428/458 |
| 4,562,100 | 12/1985 | Fryd et al. | 427/385.5 |
| 4,595,548 | 6/1986 | St. Clair et al. | 528/183 X |
| 4,603,061 | 7/1986 | St. Clair et al. | 427/162 |
| 4,690,999 | 9/1987 | Numata et al. | 528/188 |
| 4,759,958 | 7/1988 | Numata et al. | 427/385.5 |

FOREIGN PATENT DOCUMENTS 0142149 11/1984 European Pat. Off.
58-91430 11/1981 Japan.
58-180530 4/1982 Japan.
58-180531 10/1983 Japan.

OTHER PUBLICATIONS

Published Patent Application NASA Case No. LE-W-12,876-2, (Ser. No. 393,583, filed Jun. 30, 1982), No. N83-29392.
Published International Application No. WO 84/04102.
Undated brochure entitled "NR-150 Polyimide Composites", (14 pages plus 8 pages of tables and figures).
Paper entitled "371° C. Mechanical Properties of Graphite/Polyimide Composites" by Peter Delvigs.
Brochure entitled Product Data—THERMID FA-700, (7 pages including tables and graphs).
Serafini et al., NASA Technical Memorandum 79039, (Apr. 106, 1979).
Serafini et al., NASA Technical Memorandum NASA TM X-71894, (Apr. 6–8, 1976).
Delvigs et al., NASA Technical Memorandum 79062, (May 8–10, 1979).
Delvigs et al., National SAMPE Symposium & Exhibition Proceedings, vol. 24, No. 2, pp. 1053–1068, (1979).
Serafini et al., NASA Technical Memorandum 82821, (May 4–6, 1982).
Serafini, NASA Technical Memorandum 83047, (Nov. 10–12, 1982).
"THERMID Polyimides", Brochure of National Starch and Chemical Corporation, (undated).

Primary Examiner—William R. Dixon, Jr.
Assistant Examiner—Ellen McAvoy
Attorney, Agent, or Firm—John F. Sieberth

[57] ABSTRACT

Reciprocating engine parts which involve substantially continuous frictional contact are coated with a solid film lubricant having excellent wear characteristics and adhesion. The parts in question are pistons, and the area to which the wear resistant solid lubricant film is bonded is the piston skirt—i.e., all or a portion of the area below the piston rings. The lubricant film is composed of a polyimide of 2,2-bis[4-(4-aminophenoxy)-phenyl]hexafluoropropane ("4-BDAF") and an aromatic tetracarboxylic acid (or dianhydride or ester thereof) containing from 25 to 125 parts by weight of fluorinated carbon per 100 parts by weight of the polyimide resin ("phr"), and preferably about 30 to about 100 phr of the fluorinated carbon.

15 Claims, No Drawings

PISTONS WITH WEAR RESISTANT SOLID FILM LUBRICANT COATINGS

TECHNICAL FIELD

This invention relates to a wear resistant solid film lubricant surface for engine parts, notably reciprocating pistons.

BACKGROUND

It has been proposed heretofore to use as a coating for air bearings a film of fluorinated carbon embedded in a polyimide of 2,2-bis[4-(4-aminophenoxy)phenyl]hexafluoropropane ("4-BDAF") and pyromellitic dianhydride ("PMDA"). In air bearings the rotating surfaces operate with a film of air between them and only occasionally do the metal surfaces come in actual contact with each other. Heretofore this coating composition has been indicated to be suitable for other, unspecified purposes.

It has also been proposed heretofore to utilize as a protective coating for piston skirts a system composed of graphite embedded in 4-BDAF/PMDA polyimide or in the polyimide of 4-BDAF and BTDA (benzophenonetetracarboxylic acid dianhydride). While this coating was reasonably effective (it survived for about 400 hours in engine dynamometer tests), a coating lasting at least 1,000 hours in this test is desired.

THE INVENTION

In accordance with this invention, reciprocating engine parts which involve substantially continuous frictional contact are coated with a solid film lubricant having excellent wear characteristics and adhesion. The parts in question are pistons, and the area to which the wear resistant solid lubricant film is bonded is the piston skirt—i.e., all or a portion of the area below the piston rings.

The lubricant film is composed of a polyimide of 2,2-bis[4-(4-aminophenoxy)phenyl]hexafluoropropane ("4-BDAF") and an aromatic tetracarboxylic acid (or dianhydride or ester thereof) containing from 25 to 125 parts by weight of fluorinated carbon per 100 parts by weight of the polyimide resin ("phr"), and preferably about 30 to about 100 phr of the fluorinated carbon.

These polyimides have repeating units of the formula

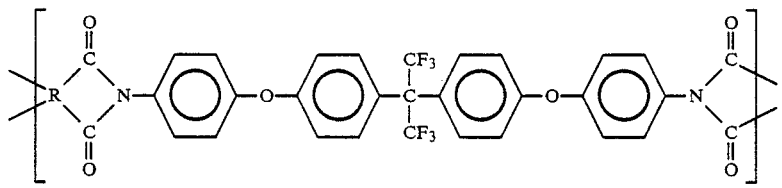

where R is the organic group of the aromatic tetracarboxylic acid.

To form the solid lubricant film it is desirable to apply to the piston skirt surface a dispersion of the fluorinated carbon in a solution of polyamic acid of 4-BDAF and the aromatic tetracarboxylic acid (or dianhydride or ester thereof) and subject the wetted surface to a temperature sufficient to drive off the solvent. This process may be repeated for a sufficient number of times to build up a coating of desired thickness. Thereupon sufficient heat is applied to cure the coating (i.e., convert the polyamic acid polymer into polyimide polymer). For best results the dispersion should be applied by means of spraying apparatus using a suitably dilute solution of the polyamic acid containing the dispersed finely divided or powdery fluorinated carbon.

The aromatic tetracarboxylic acid utilized in the coatings of this invention includes pyromellitic acid, 3,3',4,4'-benzophenonetetracarboxylic acid, 2,2-bis(3,4-dicarboxylphenyl)hexafluoropropane, oxydiphthalic acid, and biphenyl tetracarboxylic acid. In most cases, these acids are employed in the form of their dianhydrides although they may be employed as diesters or as the free acids or as mixtures of such materials. Use of pyromellitic acid and benzophenonetetracarboxylic acid (or their dianhydrides or esters) is preferred. As is well known the polyamic acids are formed by reacting essentially equimolar quantities of 4-BDAF and the aromatic tetracarboxylic acid (or dianhydride or ester thereof) in a suitable solvent.

Any of a variety of solvents may be used to form the solution of the polyamic acid. For this purpose dipolar aprotic solvents such as dimethylformamide, dimethylacetamide, N-methylpyrrolidone, diglyme, dimethylsulfoxide, or the like are preferred. Other solvents which may be used include ethers such as tetrahydrofuran, tetrahydropyran, etc.; chlorohydrocarbons such as methylene dichloride, etc.; ketones such as acetone, methyl ethyl ketone, etc.; alcohols such as methanol, ethanol, propanol, isopropanol, etc.; and the like.

Various grades of fluorinated carbon are available as articles of commerce from Allied-Signal Corporation under the trademark ACCUFLUOR. A particularly useful grade is ACCUFLUOR 1030 which is recommended by Allied-Signal for applications where good wear resistance is desired.

The filled coatings of the invention are extremely adherent to metals and alloys used in the manufacture of pistons, such as aluminum. Moreover, the solid film lubricant adheres tenaciously to the metal substrate despite the exposure of the coating during use to lubricating oils which usually contain various additives such as dispersant-detergents, viscosity index improvers, rust inhibitors, and the like.

The following example illustrates the practice of this invention.

EXAMPLE

Fluorinated carbon (ACCUFLUOR 1030) was dispersed in solutions of 4-BDAF/PMDA polyamic acid and 4-BDAF/BTDA polyamic acid. The resultant compositions were spray coated on aluminum piston skirts. The dispersions were formed at two different concentration levels (15 and 35 percent pigment volume concentration or 25 and 50 weight percent based on total solids) in each of the two polyamic acid systems. Thus four different spray formulations were produced and employed.

The compositions of the spray formulations were as follows:

Formulation 1 - based on an initial solution containing 12.5 g of 4-BDAF/PMDA polyamic acid for each 37.5 g of N-methylpyrrolidone (NMP) solvent.

50 g initial solution
8.9 g NMP
168.4 g methyl ethyl ketone (MEK)
4.2 g fluorinated carbon This formulation had a pigment volume concentration of 15 percent.

Formulation 2—same as Formulation 1 except it contained 12.5 g of fluorinated carbon. Thus Formulation 2 had a pigment volume concentration of 35 percent.

Formulation 3—same as Formulation 1 except it was based on an initial solution containing 12.5 g of 4-BDAF/BTDA polyamic acid for each 37.5 g of NMP solvent. Thus this formulation had a pigment volume concentration of 15 percent.

Formulation 4—same as Formulation 3 except it contained 12.5 g of fluorinated carbon. Thus Formulation 4 had a pigment volume concentration of 35 percent.

In preparing these spray formulations the initial solution of polyamic acid in NMP was first diluted with all of the additional NMP and 40 percent of the amount of MEK to be used in forming the diluted spray solution. Another 40 percent of the MEK to be used in forming the spray solution was used as the dispersion medium for the fluorinated carbon which was dispersed therein by means of a high shear stirrer. This dispersion was promptly mixed with the polymer solution. The remaining 20 percent of the MEK to be used in forming the spray solution was then used to rinse the shear stirrer and these washings were combined with the rest of the spray formulation. The formulation was continuously stirred using a magnetic stir plate.

Aluminum pistons to be coated with the foregoing formulations were scrubbed with a detergent powder, rinsed thoroughly with tap water, sanded with 400-grit paper to remove imperfections and rinsed with tap water and dried with towels. Thereupon the cleansed pistons were solvent rinsed and wiped with dry toluene followed by solvent rinsing and wiping with dry acetone. Finally, the so-treated pistons were heated for two hours at 600° F. when prepared for use with the 4-BDAF/BTDA polyamic acid formulations or 675° F. when prepared for use with the 4-BDAF/PMDA polyamic acid formulations.

The dried and cleansed pistons were spray coated on a turntable using a commercially available spray gun operated at a pressure of 40 psig nitrogen (anhydrous). The piston ring areas and other areas to be devoid of coating were covered by means of adhesive tape. The spraying procedure was as follows:

1. Preheat piston to 225° F. in an oven.
2. Remove piston from oven and allow to cool to 150° F.
3. Spray coat with formulation at room temperature to form an approximately 0.5 mil coating after solvent removal.
4. Oven dry at 225° F. for 15 minutes.
5. Repeat Steps 2-4 to produce another 0.5 mil layer.
6. Increase oven temperature to 465° F. and hold the piston at this temperature for 1 hour.
7. Cool piston to 225° F.
8. Repeat Steps 2-7 until desired coating thickness is obtained.
9. Cure coating on the piston in the oven for 2 hours at 465° F.
10. Raise oven temperature to post-cure temperature of 600° F. for the formulations based on 4-BDAF/BTDA, 675° F. for the formulations based on 4-BDAF/PMDA. Hold the coated piston at this temperature for 2 hours.
11. Slowly cool the piston to room temperature.

The thickness of the coatings on the finished coated pistons were as follows:

| Number of Coats Applied | Pigment Volume | Coating Thickness |
| --- | --- | --- |
| 2 | 15 | 1.25–2 mils |
| 2 | 35 | 2–2.75 mils |
| 4 | 15 | 3.25–3.5 mils |
| 3 | 35 | 3.25–3.5 mils |

The coated pistons are suitable for use in the operation of the internal combustion engine for which they are adapted. The coating adheres tenaciously during the operation and the coating exhibits improved lubricity as compared to the base metal.

This invention is susceptible to considerable variation in its practice within the spirit and scope of the appended claims.

What is claimed is:

1. A piston having bonded to its skirt portion a wear resistant solid film lubricant consisting essentially of (a) fluorinated carbon in a matrix of (b) a polyimide derived from 2,2-bis[4-(4-aminophenoxy)phenyl]hexafluoropropane and at least one of the following aromatic tetracarboxylic acids or a dianhydride or ester thereof:
pyromellitic acid
benzophenonetetracarboxylic acid
2,2-bis(3,4-dicarboxyphenyl)hexafluoropropane oxydiphthalic acid
biphenyltetracarboxylic acid.

2. The article of claim 1 wherein the aromatic tetracarboxylic acid component of the polyimide is based on pyromellitic acid or its dianhydride or an ester thereof.

3. The article of claim 1 wherein the aromatic tetracarboxylic acid component of the polyimide is based on benzophenonetetracarboxylic acid or its dianhydride or an ester thereof.

4. The article of claim 1 wherein the aromatic tetracarboxylic acid component of the polyimide is based on the dianhydride of the aromatic tetracarboxylic acid.

5. The article of claim 1 wherein the piston is an aluminum piston.

6. In an engine comprising at least one cylinder having a piston reciprocatably disposed therein and means for applying liquid lubricating oil to surfaces of each such cylinder and piston, the improvement in which each such piston has bonded to its skirt portion a wear resistant solid film lubricant consisting essentially of (a) fluorinated carbon in a matrix of (b) a polyimide derived from 2,2-bis[4-(4-aminophenoxy)phenyl]hexafluoropropane and at least one of the following aromatic tetracarboxylic acids or a dianhydride or ester thereof:
pyromellitic acid
benzophenonetetracarboxylic acid
2,2-bis(3,4-dicarboxyphenyl)hexafluoropropane oxydiphthalic acid
biphenyltetracarboxylic acid.

7. The improvement of claim 6 wherein the aromatic tetracarboxylic acid component of the polyimide is based on pyromellitic acid or its dianhydride or an ester thereof.

8. The improvement of claim 6 wherein the aromatic tetracarboxylic acid component of the polyimide is based on benzophenonetetracarboxylic acid or its dianhydride or an ester thereof.

9. The improvement of claim 6 wherein the aromatic tetracarboxylic acid component of the polyimide is based on the dianhydride of the aromatic tetracarboxylic acid.

10. The improvement of claim 6 wherein each such piston is an aluminum piston.

11. In producing a coated piston, the improvement which comprises applying to the skirt portion thereof a coating consisting essentially of a dispersion of (a) fluorinated carbon in a solution of (b) a polyamic acid derived from 2,2-bis[4-(4-aminophenoxy)-phenyl]hexafluoropropane and at least one of the following aromatic tetracarboxylic acids or a dianhydride or ester thereof:
pyromellitic acid
benzophenonetetracarboxylic acid
2,2-bis(3,4-dicarboxyphenyl)hexafluoropropane
oxydiphthalic acid
biphenyltetracarboxylic acid; and
applying sufficient heat to cure the coating such that the polyamic acid polymer is converted into polyimide polymer.

12. The improvement of claim 11 wherein the aromatic tetracarboxylic acid component of the polyamic acid is based on pyromellitic acid or its dianhydride or an ester thereof.

13. The improvement of claim 11 wherein the aromatic tetracarboxylic acid component of the polyamic acid is based on benzophenonetetracarboxylic acid or its dianhydride or an ester thereof.

14. The improvement of claim 11 wherein the aromatic tetracarboxylic acid component of the polyamic acid is based on the dianhydride of the aromatic tetracarboxylic acid.

15. The improvement of claim 11 wherein the piston is an aluminum piston.

* * * * *